Dec. 30, 1969

D. D. HOWARD 3,487,406

SIGNAL PROCESSOR FOR DIVERSITY FREQUENCY RADAR

Filed Dec. 23, 1968

INVENTOR
DEAN D. HOWARD

BY James G. Murray
R. S. Sciascia ATTORNEYS

United States Patent Office 3,487,406
Patented Dec. 30, 1969

3,487,406
SIGNAL PROCESSOR FOR DIVERSITY FREQUENCY RADAR
Dean D. Howard, Oxon Hill, Md., assignor to the United States of America as represented by the Secretary of the Navy
Filed Dec. 23, 1968, Ser. No. 785,882
Int. Cl. G01s 9/02, 7/28
U.S. Cl. 343—7.3                               5 Claims

ABSTRACT OF THE DISCLOSURE

A pulse-to-pulse frequency diversity tracking radar wherein target angle scintillation is minimized by using the frequency giving the strongest echo for tracking.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Pulse-to-pulse frequency diversity radar techniques, i.e., techniques by which the R-F of each radar transmitted pulse is different from the preceding pulse, are widely known and have been practiced largely with high powered search radar to extend the unambiguous range. Such techniques have not, until very recently, been extensively used in tracking radar.

Target angle scintillation is a basic limitation to the accuracy of tracking radars and occurs because the many reflecting surfaces of a typical target, such as an aircraft, do not reflect a perfectly plane wave but instead produce warped wave echoes which are interpreted by the radar receiver as a wander, as a function of time, of the apparent position of the target. This wander is so slow that conventional integration or averaging techniques do not significantly reduce the scintillation error.

Recently efforts have been made to utilize the pulse-to-pulse frequency diversity techniques to reduce target angle scientillation in tracking radar since it has been found that different target wander occurs with different R-F. These prior efforts have concentrated on averaging the position of the target as indicated by the various different frequencies used in the pulse-to-pulse frequency diversity and have significantly reduced the effects of target angle scintillation.

SUMMARY OF THE INVENTION

The invention described herein employs a different approach for reducing target angle scintillation or wander in tracking radar from the prior used averaging technique described above. It has been found that larger angle scintillation errors occur during the time when the echo signal amplitude fades or drops in level and that the smaller errors occur when the echo amplitude is largest. As will presently be disclosed in detail, the invention contemplates the comparison of the returns of the various frequencies used in the pulse-to-pulse frequency diversity and the selection and use for tracking purposes of the frequency giving the strongest echo.

OBJECTS OF THE INVENTION

It is, therefore, an object of this invention to provide an improved tracking radar.

A further object is to provide an improved tracking radar wherein target angle scintillation is minimized.

Yet another object of the present invention is the provision of an improved tracking radar using pulse-to-pulse frequency diversity to minimize the inaccuracies caused by target wander.

A still further object is to provide an improved tracking radar wherein pulse-to-pulse frequency diversity is used to minimize target angle scintillation by selecting and using for tracking that frequency which gives the strongest echo.

DESCRIPTION OF THE DRAWINGS

Other objects and many of the attendant advantages of this invention will be readily appreciated as the same becomes better understood by reference to the following detailed description of a preferred embodiment of the invention when considered in connection with the accompanying drawings in which like reference numerals designate like parts throughout the figures thereof and wherein.

DESCRIPTION OF THE PREFERRED EMBODIMENT

Figure 1:
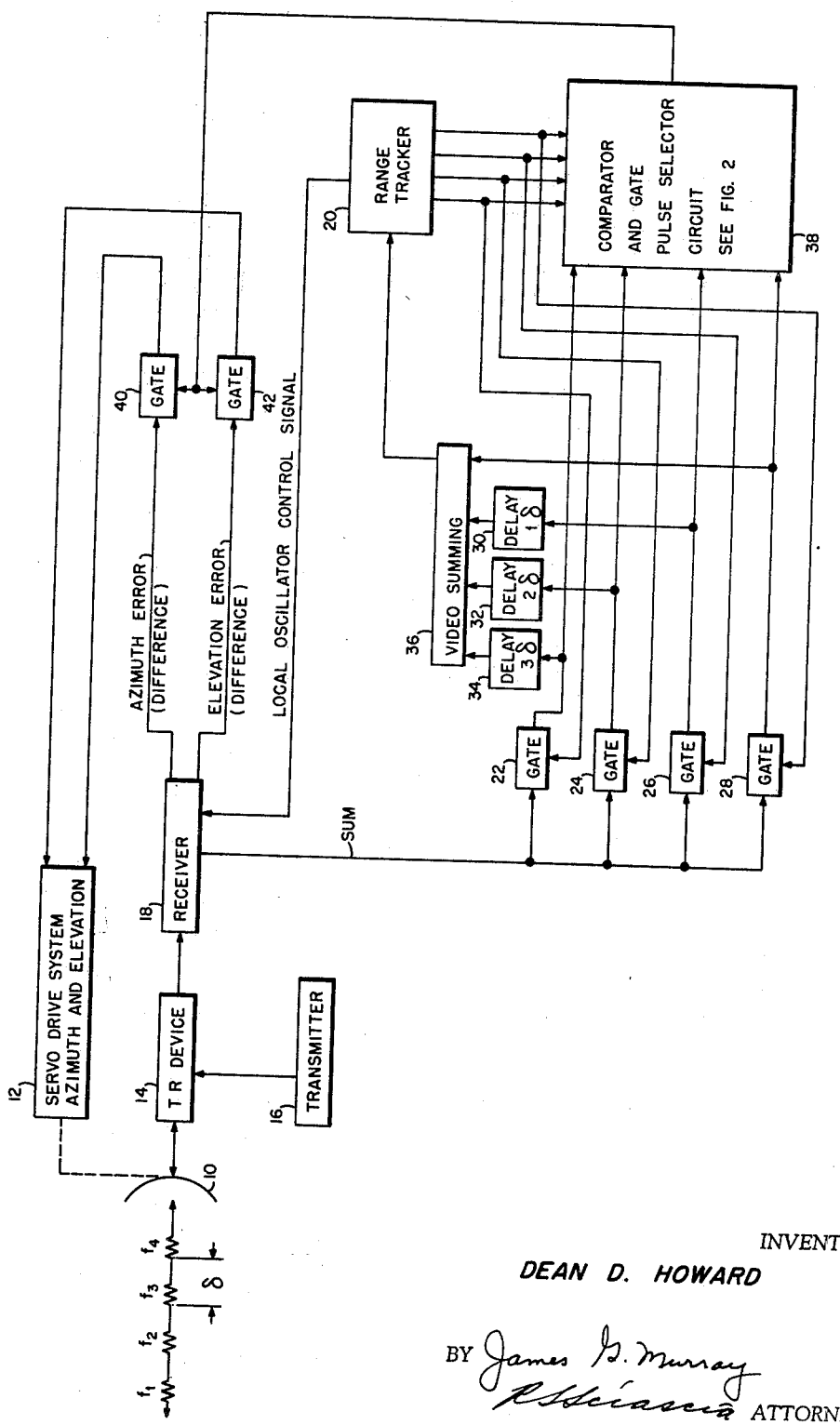
FIG. 1 illustrates a preferred embodiment of the invention in block diagram form and FIG. 2 shows details of the comparator and gate pulse selector circuit included in FIG. 1.

Referring now to FIG. 1, wherein a preferred embodiment of the invention is illustrated in block diagram form, there is shown a tracking radar which includes antenna 10 that is positioned in elevation and azimuth by a servo drive system 12. Antenna 10 is connected in a conventional manner through TR device 14 to a transmitter 16 and a receiver 18. As shown, for each PRF interval the signal transmitted and the echoes received by antenna 10 comprises a burst of four different frequency pulses $f_1$, $f_2$, $f_3$ and $f_4$. These pulses are spaced at intervals of $\delta$.

The receiver 18 is of the three channel type conventionally used in monopulse tracking radar except, of course, that the local oscillator must be frequency stepped so that the received RF pulse pattern $f_1$, $f_2$, $f_3$ and $f_4$ is reduced to a common IF. As described in more detail in many reference books, such as chapter 5 in Introduction to Radar Systems, by Merrill I. Skolnik, three channel receivers produce three video output signals, two bipolar difference signals which are representative of azimuth and elevation error and a sum signal which is used for range determination. As shown in FIG. 1, the range tracking unit 20, upon locating and locking on a target, controls the receiver local oscillator and gates 22, 24, 26 and 28 so that the receiver video sum signal resulting from pulse $f_1$ passes through gate 22, the signal resulting from pulse $f_2$ passes through gate 24, etc. After passing through the gates 22, 24, 26 and 28, the video sum signals are delayed by delay units 30, 32 and 34 to simultaneously arrive at and be summed by video summing unit 36 which produces a signal that controls the range tracking unit 20.

Figure 2:
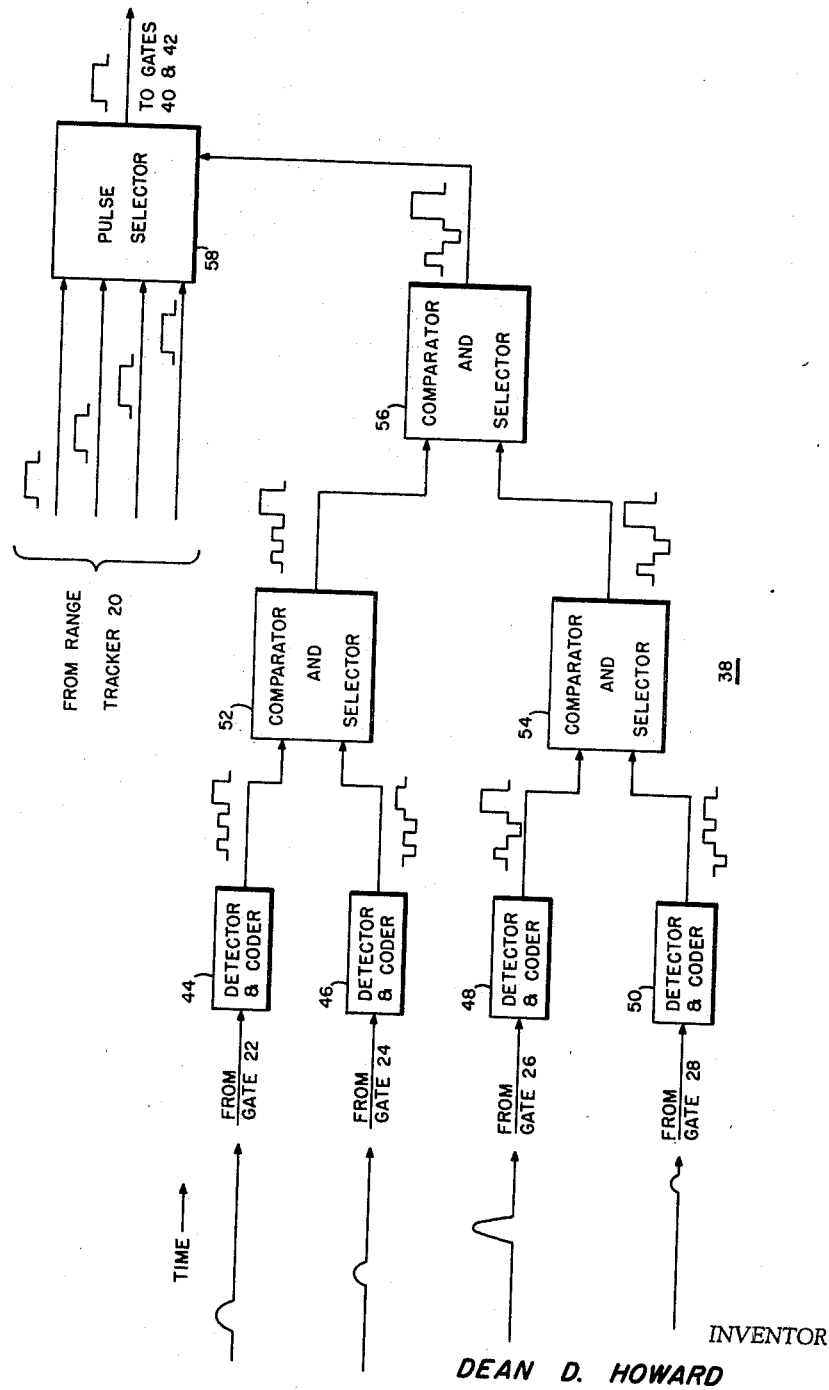

The output signals from gates 22, 24, 26 and 28, which are the video sum signals resulting from the received pulses $f_1$, $f_2$, $f_3$ and $f_4$, are connected to the Comparator and Gate Pulse Selector Circuit 38 which also is connected to receive the signals from range tracking unit 20 that control gates 22, 24, 26 and 28. These control signals are, of course, time separated by $\delta$ intervals. Unit 38, which will be more fully described in connection with FIG. 2, compares the signals received from the gates and passes the control signal from range tracking unit 20 that is connected to the gate 22, 24, 26 or 28 which passes the largest sum signal. The signal passed by unit 38 is connected to and opens gates 40 and 42 so that the bi-polar difference signals from receiver 18 that are the results of the pulse $f_1$, $f_2$, $f_3$ or $f_4$ that produces the strongest sum signal at unit 38, are passed to and control the azimuth and elevation servo drive system 12.

Referring now to FIG. 2 which illustrates the unit 38, the video sum signals resulting from pulses $f_1$, $f_2$, $f_3$ and $f_4$ which were passed by gates 22, 24, 26 and 28, are applied to Detector and Coder units 44, 46, 48 and 50. These units can be designed in many forms, using conventional components such as box car amplifiers, one-shot multivibrators, inverters, etc., in obvious circuits, and function to produce (as shown) two binary coded pulses which identify the related pulse $f_1$, $f_2$, $f_3$ or $f_4$, followed by a square pulse at the level of the pulse received from gates 22, 24, 26, and 28. As shown, the output of unit 44 is coded 1—1, considering a positive pulse as 1, the output of unit 46 is coded as 0—0, the output of unit 48 is coded as 1-0 and the output of unit 50 is coded as 0-1.

The outputs of units 44 and 46 are connected to Comparator and Selector unit 52 which functions to pass the larger signal, that is the signal from unit 44. In similar manner the Comparator and Selector unit 54 receives the outputs from units 48 and 50 and passes the larger signal from unit 48. The comparison and selector process is repeated by unit 56 which passes the larger signal from unit 54 to the pulse selector 58.

Unit 58 is connected to receive the four time spaced output pulses from range tracker 20 that are also connected to control gates 22, 24, 26 and 28. Under the control of the binary coded signal from Comparator and Selector 56, the unit 58 passes the appropriate pulse from range tracker 20 to control the gates 40 and 42 (FIG. 1) so that the azimuth and elevation servo drive system 12 is driven by the bi-polar difference signals from receiver 18 that are the result of the pulse $f_1$, $f_2$, $f_3$ or $f_4$ that produced the strongest sum signal as determined by the unit 38 (FIG. 2).

Many circuits are known which are suitable for use as components 52, 54, 56 and 58. Since these circuits are not per se inventive and are known in the prior art, they are not more extensively disclosed herein.

By now the operation of the invention will be apparent. Transmitter 16, TR device 14, antenna 10 and receiver 18 cooperate in a conventional manner during each PRF period to radiate and receive pulses $f_1$, $f_2$, $f_3$ and $f_4$ which are sufficiently frequency diverse so that different target scintillation or wander patterns occur. The receiver video sum signals, after being properly delayed by components 30, 32 and 34 to be simultaneous, are summed and are used to control the range tracker 20 which functions to control the local oscillator in receiver 18 and to produce four time spaced pulses that control gates 22, 24, 26 and 28 to separate and apply the video sum signals to unit 38. This unit functions to determine which of the sum signals is largest and to pass the appropriate one of the time spaced pulses from range tracker 20 to open gates 40 and 42 at the correct time to pass the bi-polar difference signals from receiver 18 which are the result of the pulse $f_1$, $f_2$, $f_3$, or $f_4$ that produced the strongest sum signal. The bi-polar difference signals passed by gates 40 and 42 control the azimuth and elevation servo drive system 12 which accurately positions antenna 10 with a minimum target scintillation error.

Obviously, many modifications and variations of the present invention are possible in the light of the above teachings. While the preferred embodiment shown in FIGS. 1 and 2 illustrate a conventional three-channel monopulse radar with frequency diversity arranged to switch frequency from one pulse to the next, this illustration should not be interpreted as precluding an implementation with other pulsing arrangements and other types of tracking radars such as two channel monopulse, conical scan and other methods or as precluding operation with a radar that scans frequency continuously within a pulse. Also, it is contemplated that the invention could be used with coherent pulse compression systems.

What is claimed and desired to be secured by Letters Patent of the United States is:

1. The method of tracking an object by radar with a minimum of target scintillation by causing said radar to perform the steps of:
    repetitively radiating a plurality of electromagnetic pulses which are different in frequency according to a predetermined sequence;
    receiving echoes of said pulses from said object;
    comparing said received echoes and determining which frequency pulses produced the strongest echoes and
    using said pulses which produced the strongest echoes to track said object
    whereby said object is tracked with a minimum of target scintillation.

2. Radar apparatus for tracking an object with a minimum of target scintillation comprising:
    transmitting means which repetitively radiate a plurality of electromagnetic pulses that are different in frequency according to a predetermined sequence;
    receiving means which receive echoes of said pulses from said object;
    a positionable antenna which is connected to and which intermittently and alternately functions as part of said transmitting means and as part of said receiving means;
    servo drive means connected to said positionable antenna and which functions to mechanically point said antenna at said object and
    comparing and selecting means connected to said receiving means and to said servo drive means and functioning to determine which frequency pulses produced the strongest echoes and to apply only said strongest echoes to energize said servo drive means
    whereby said object is tracked with a minimum of target scintillation.

3. Radar apparatus for tracking an object with a minimum of target scintillation comprising:
    transmitting means which repetitively produce and radiate a plurality of electromagnetic pulses that are different in frequency according to a predetermined sequence;
    receiving means which receive echoes of said pulses from said object and which produce first, second and third signals from each received echo;
    a positionable antenna which is connected to and which intermittently and alternately functions as part of said transmitting means and as part of said receiving means;
    servo drive means connected to said positionable antenna and which functions to mechanically point said antenna at said object;
    gating means which intermittently connect said second and third receiver signals to energize said servo drive means and
    comparing and selecting means connected to receive said first receiver signal and functioning to determine, by comparing, which frequency pulse echo produces the strongest first signal and connected to and functioning to control said gating means so that said servo drive means is energized only by said second and third receiver signals which result from the frequency pulse echoes which produce said strongest first signals
    whereby said object is tracked with a minimum of target scintillation.

4. The apparatus of claim 3 and further including:

video summing means connected to receive and to sum said first receiver signals and range tracking means connected to said video summing means and functioning to control said receiver.

5. The apparatus of claim 4 wherein said comparing and selecting means includes:

coding means connected to receive said first receiver signals and to add a coded identification thereto;

comparator and selector means connected to said coding means to determine which of said first receiver signals are strongest and pulse selector means connected to receive sequential pulses from said range tracking means and to receive the strongest of said coded first receiver signals from said comparator and selector means and functioning to produce an output signal which is connected to control said gating means.

References Cited

UNITED STATES PATENTS

| | | | |
|---|---|---|---|
| 3,184,741 | 5/1965 | Buck | 343—17.2 |
| 3,324,469 | 6/1967 | Szerlip | 343—17.2 |
| 3,383,686 | 5/1968 | Davis et al. | 343—17.2 X |

RODNEY D. BENNETT, JR., Primary Examiner

T. H. TUBBESING, Assistant Examiner

U.S. Cl. X.R.

343—7.4, 17.2